(12) United States Patent
Eddy et al.

(10) Patent No.: US 7,738,853 B2
(45) Date of Patent: Jun. 15, 2010

(54) LOW NOISE FIGURE RADIOFREQUENCY DEVICE

(75) Inventors: Michael M. Eddy, Santa Barbara, CA (US); Gregory L. Hey-Shipton, Santa Barbara, CA (US)

(73) Assignee: Antone Wireless Corporation, Goleta, CA (US)

( * ) Notice: Subject to any disclaimer, the term of this patent is extended or adjusted under 35 U.S.C. 154(b) by 628 days.

(21) Appl. No.: 11/742,562

(22) Filed: Apr. 30, 2007

(65) Prior Publication Data

US 2007/0202920 A1   Aug. 30, 2007

Related U.S. Application Data

(63) Continuation-in-part of application No. 11/257,891, filed on Oct. 25, 2005, now Pat. No. 7,457,640.

(60) Provisional application No. 60/746,366, filed on May 4, 2006, provisional application No. 60/623,552, filed on Oct. 29, 2004.

(51) Int. Cl.
   *H04B 1/16*   (2006.01)
(52) U.S. Cl. ............... 455/341; 455/127.3; 455/194.2; 455/153.3; 455/311; 330/303; 333/134; 375/272
(58) Field of Classification Search ............ 455/341, 455/127.3, 194.2, 153.2, 311, 114.3, 144, 455/293; 330/303, 336; 333/134, 206; 375/272
See application file for complete search history.

(56) References Cited

U.S. PATENT DOCUMENTS

| | | | |
|---|---|---|---|
| 4,453,146 A | 6/1984 | Fiedziuszko | |
| 4,489,293 A | 12/1984 | Fiedziuszko | |
| 4,652,843 A | 3/1987 | Tang et al. | |
| 5,170,500 A * | 12/1992 | Broderick | 455/315 |
| 5,220,300 A | 6/1993 | Snyder | |
| 5,268,659 A | 12/1993 | Zaki et al. | |
| 5,604,925 A | 2/1997 | O'Malley et al. | |
| 5,841,330 A | 11/1998 | Wenzel et al. | |
| 5,949,309 A | 9/1999 | Correa | |
| 6,072,376 A * | 6/2000 | Matsuyoshi et al. | 333/134 |

(Continued)

OTHER PUBLICATIONS

PCT International Search Report for PCT/US2007/067955, Applicant: Antone Wireless Corporation, Forms PCT/ISA/220 and PCT/ISA/210, dated Jan. 15, 2008 (4 pages).

(Continued)

*Primary Examiner*—Minh D Dao
(74) *Attorney, Agent, or Firm*—Koppel, Patrick, Heybl & Dawson

(57) ABSTRACT

A RF device such as a tower mounted amplifier (TMA), mast-head amplifier (MHA), or Tower Mounted Boosters (TMB) includes a housing having a plurality of cavities and an input and an output, the input being coupled to the antenna and the output being coupled to a base station. The housing includes a transmission path holding multiple coaxial resonators. The housing further includes multiple receive paths including at least one path having a plurality of cavities, each cavity containing a dielectric resonator. The metallic transmit resonator nearest the antenna input is coupled to the first dielectric resonator via a common resonant wire. The last dielectric resonator in the receive path is coupled to a first metallic resonator of a downstream clean-up filter via another common resonant wire.

38 Claims, 7 Drawing Sheets

U.S. PATENT DOCUMENTS

| | | | |
|---|---|---|---|
| 6,094,113 | A | 7/2000 | Wenzel et al. |
| 6,100,847 | A | 8/2000 | Sointula |
| 6,211,752 | B1 | 4/2001 | Gendraud et al. |
| 6,212,404 | B1 | 4/2001 | Hershtig |
| 6,239,673 | B1 | 5/2001 | Wenzel et al. |
| 6,262,639 | B1 | 7/2001 | Shu et al. |
| 6,263,215 | B1 | 7/2001 | Patton et al. |
| 6,542,049 | B2 | 4/2003 | Henningsson et al. |
| 6,650,208 | B2 | 11/2003 | Karhu |
| 6,686,811 | B2 | 2/2004 | Hey-Shipton |
| 6,711,394 | B2 * | 3/2004 | Abdelmonem ............. 455/307 |
| 6,734,401 | B2 | 5/2004 | Bedingham et al. |
| 6,927,646 | B2 * | 8/2005 | Niemi ....................... 333/101 |
| 6,937,666 | B2 * | 8/2005 | Pasternak et al. ........... 375/272 |
| 6,946,933 | B2 | 9/2005 | Accatino et al. |
| 7,023,272 | B2 * | 4/2006 | Hung et al. ................. 330/126 |
| 7,245,186 | B2 * | 7/2007 | Chang et al. ................ 330/302 |
| 7,289,574 | B2 * | 10/2007 | Parolari ...................... 375/295 |
| 7,305,261 | B2 * | 12/2007 | Aiga et al. .................. 505/210 |
| 7,388,537 | B2 * | 6/2008 | Martinson et al. ............. 342/20 |
| 7,457,640 | B2 * | 11/2008 | Eddy ....................... 455/562.1 |
| 7,457,651 | B2 * | 11/2008 | Accatino et al. ............ 505/210 |
| 7,469,128 | B2 * | 12/2008 | Pastemak et al. ............. 455/86 |
| 2001/0055960 | A1 * | 12/2001 | Abdelmonem ............. 455/307 |
| 2002/0047003 | A1 | 4/2002 | Bedingham et al. |
| 2004/0008094 | A1 * | 1/2004 | Niemi ....................... 333/101 |
| 2004/0108629 | A1 | 6/2004 | Imanaka et al. |
| 2004/0120418 | A1 * | 6/2004 | Pasternak et al. ........... 375/272 |
| 2004/0135654 | A1 | 7/2004 | Karhu et al. |
| 2004/0218686 | A1 * | 11/2004 | Pastemak et al. ........... 375/272 |
| 2005/0003792 | A1 * | 1/2005 | Aiga et al. .................. 455/339 |
| 2005/0030130 | A1 | 2/2005 | Alford |
| 2005/0136876 | A1 | 6/2005 | Broholm |
| 2005/0164888 | A1 | 7/2005 | Hey-Shipton |
| 2005/0231290 | A1 * | 10/2005 | Hung et al. ................. 330/311 |
| 2006/0001492 | A1 * | 1/2006 | Chang et al. ................ 330/306 |
| 2007/0035358 | A1 * | 2/2007 | Accatino et al. ............ 333/99 S |
| 2008/0007444 | A1 * | 1/2008 | Martinson et al. ............. 342/20 |
| 2008/0242242 | A1 * | 10/2008 | Mele et al. ................. 455/90.2 |

OTHER PUBLICATIONS

PCT Written Opinion for PCT/US2007/067955, Applicant: Antone Wireless Corporation, Form PCT/ISA/237, dated Jan. 15, 2008 (6 pages).

Brochure, KMW, (1page) (2004).

The International Bureau International Preliminary Report for PCT/US2007/067955, Applicant: Antone Wireless Corporation, Form PCT/IB/326, dated Nov. 13, 2008 (5 pages).

* cited by examiner

LOW NOISE FIGURE RADIOFREQUENCY DEVICE

RELATED APPLICATIONS

This application is a continuation-in-part of U.S. application Ser. No. 11/257,891 filed on Oct. 25, 2005, now U.S. Pat. No. 7,457,640, which itself claims priority to U.S. Provisional Application No. 60/623,552 filed on Oct. 29, 2004. This application also claims priority to U.S. Provisional Patent Application No. 60/746,366 filed on May 4, 2006. The above-noted applications are incorporated by reference as if set forth fully herein.

FIELD OF THE INVENTION

The field of the invention generally relates to low noise figure radiofrequency (RF) devices such as tower mounted amplifiers (TMA's) used in wireless applications. More specifically, the field of the invention relates to the specific design features that are used to produce both a low noise figure and rejection in compact devices. These designs have applications in Tower Mounted Amplifiers ("TMAs") or Mast-Head Amplifiers ("MHAs"), Tower Mounted Boosters ("TMBs") or any other application where low noise figure, rejection of interfering signals and compact size are requirements such as, for example, remote RF applications, and repeater applications.

BACKGROUND OF THE INVENTION

As mobile usage increases, wireless service providers are increasingly faced with the challenge of optimizing and/or expanding their wireless networks to provide better service for their customers while also minimizing their network capital expenditures. TMAs (or MHAs) and TMBs are currently being used extensively in wireless networks to improve the range of cellular base stations. Generally, a TMA or MHA consists of a filter and low noise amplifier ("LNA") which is mounted at or near the top of a base station tower. TMAs and MHAs improve signal quality by boosting the uplink (Rx) signal of a mobile system immediately after the antenna. TMAs and MHAs compensate for the loss in signal that occurs in the coaxial cable run from the antenna to the base transceiver station ("BTS"). The goal of TMAs and MHAs is to amplify the in-band signal close to the antenna so as to provide the lowest possible noise contribution to the overall receiver system. The noise figure of the TMA should be as low as possible, so as to minimize the noise from the TMA itself. For example, a difference of 1 dB in the noise figure results in a difference in coverage of ~20%. Thus, even small changes in the noise figure as measured in dBs (which are measured on a logarithmic scale) can significantly affect the overall performance characteristics of the device.

TMAs and MHAs can result in increased coverage area for a given base station. This allows mobile subscribers to place more calls, place longer calls, increase data throughput, as well as reduce the number of dropped calls. This also reduces the overall number of base stations required to cover a specific area, hence, minimizing overall capital and operating expenditures. Capital expenditures for wireless towers/base stations can be very expensive. For example, it is estimated that each tower/base station can cost between about $500,000 and $750,000. In addition, each base station requires ongoing site lease expenses, backhaul (such as T1 lease), maintenance, totaling ~$50,000 per year. Because if of this, TMAs and MHAs have the ability to significantly reduce overall capital and operating expenditures on wireless infrastructure because a lower number of towers/base stations may be used to provide the same amount of coverage for a particular area.

TMAs or MHAs have become increasingly used as wireless carriers move to higher frequencies (i.e., greater than about 1.5 GHz) because RF propagation losses are much higher and service range is much shorter at these frequencies (as compared to ~850 MHz—the initial deployment frequency of cellular in the United States) and ~900 MHz or 450 MHz (initial deployment frequency in Europe). TMAs or MHAs are typically overlaid on top of existing base station infrastructure in order to avoid the high cost to site and construct additional base station towers. Current TMAs or MHAs rely on metal resonator/air-filled, cavity-based filters which can have low loss but poor filtering characteristics or good filtering characteristics and high loss. It is important, however, to reduce out-of-band signals as much as possible because signals passing through the filters will be amplified and passed to the BTS. This is particularly important because the presence of out-of-band interfering signals will produce additional noise in the system because of spurious signals generated within the non-linear components such as the LNA and mixers, or saturation of the components resulting in significantly reduced performance from the system.

The problem is that in order to mount the LNA as close as possible to the antenna, the filter in the TMA or MHA must necessarily be small because of the limited space or "real estate" at the top of the tower. In current metal resonator/air cavity-based filters, this necessitates poor filtering performance. While high performance metal resonator/cavity filters are available, their large size and increased loss precludes them from being used in close-to-the antenna applications (e.g., in TMA or MHA systems).

Thus, there is a need for a RF device that provides excellent out-of-band signal rejection with low pass band loss, yet is small enough to mount close to the antenna. Preferably, the RF device can be incorporated into TMAs or MHAs which can be overlaid on existing tower infrastructure for use in a wide variety of frequencies including 2 GHz (or higher) applications.

In addition, there is a growing need for better filtering in newer (3 G) air interfaces such as CDMA and OFDM. This need for better filtering comes from the fact that on CDMA and OFDM wireless networks, any interference has a significant impact on the receiver performance, unlike earlier protocols such as analog, TDMA or GSM. Furthermore, data services are becoming increasingly important to wireless carriers. Unfortunately, data is much less forgiving than voice with respect to errors. The power amplifier design is much more complex and is limited by the out of the band emissions at maximum power. This can, however, be reduced with good filtering. Thus, newer technologies being implemented in wireless networks are driving the need for good filtering on both the transmit and the receive side of the network.

SUMMARY OF THE INVENTION

In one aspect of the invention a radiofrequency (RF) device (e.g., TMA, MHA, TMB) adapted for coupling to an antenna includes a housing having a plurality of cavities and an input and output, the input being coupled to the antenna, the output being coupled to a base station (BTS). A transmission path may be provided within the housing and includes a transmit filter. A receive path is provided within the housing and includes at least one receive filter and a low noise amplifier.

In one aspect of the invention, the noise figure of the receive path (which includes a bypass around the amplifiers)

is less than 1.2 dB over a substantial part (i.e., >50%) of the band of interest. For example, in the PCS band (1.85 GHz to 1.91 GHz), it is believed that outside of the device embodiment by the current invention, the best noise figure performance from a TMA currently available is the Powerwave Technologies, Inc., Santa Ana, Calif. PCS band TMA device (part no. LGP175nn) which specifies a typical noise figure of 1.6 dB.

In another aspect of the invention, a radiofrequency (RF) device (e.g., TMA, MHA, and TMB) is configured for coupling to an antenna includes a housing having a plurality of cavities and an input and output, the input being coupled to the antenna, the output being coupled to a base station (BTS). A transmission path may be provided within the housing and includes a plurality of transmit resonators. A receive path is provided within the housing and includes a plurality of cavities, with each cavity filled with a dielectric-based resonator. Tunable transmission zeros may be provided between non-adjacent resonators (e.g., between resonators 2-4 and 5-7 of an 8 pole receive filter). A clean-up filter may be provided downstream of the dielectric receive filter to remove high frequency, spurious responses in the transmission characteristics of the dielectric filter, typically due to higher order modes in the dielectric filled cavities. In addition, the output of the clean-up filter may pass to a low noise amplifier (LNA) which is, in turn, connected to a post-LNA filter made from a plurality of metal resonators located within cavities of the housing. The output of the post-LNA filter maybe coupled to transmit-receive diplexer which is connected to a coaxial connector to a base station, or may have a separate coaxial connection from the transmit connector to the base station.

In one aspect of the invention, the RF device has an overall volume of less than 220 in$^3$ and is mounted adjacent or near the antenna. The overall volume includes the size of the complete, finished housing and cover but omits any connectors and mounting hardware (e.g., brackets and the like). The small size is achieved by minimizing the volume of the cavities that house the dielectric pucks (i.e., resonators). For example, in one preferred aspect, the ratio of the cavity diameter to dielectric puck diameter is less than 1.5:1. The close fit between the outer circumference of the dielectric pucks and the walls of the individual cavities is different from other devices which have a large gap or space between the dielectric and the housing, thus making the device relatively large in size. The closeness of the exterior of the dielectric pucks and the walls of the cavities enables the coupling between dielectric resonators to be relatively large, necessary to cover full operating frequency bands (for example, the current PCS service in the USA has a bandwidth of 60 MHz covering the frequency range from 1850 MHz to 1910 MHz). Also, the closeness of the dielectrics in the cavities allows them to be tuned more than usual as compared to conventional dielectric-based filter designs. Typically, these conventional dielectric-based filters have a cavity to dielectric diameter ratio of 2:1 or greater, making it very difficult to produce large enough couplings necessary for the relatively wide bandwidths described above.

In certain embodiments, when transmission zeros are desirable to increase rejection, a tunable, resonant coupling device is used. For example, the device includes a resonant element which couples to the magnetic field associated with the dielectric puck and a tunable capacitor. The resonant element may include a metallic (e.g., copper wire) that is grounded at each end to the housing walls of non-adjacent cavities, thereby coupling to the electromagnetic fields in both cavities. The resonant element passes through a low loss tubular member having an aperture that receives a tuning element such as, for instance, a rotatable tuning screw or the like.

In still another aspect of the invention, the filter device includes a unique structure to form a coupling and phasing network between a metallic filter and the dielectric filter, to form a diplexer (or duplexer) function. The coupling uses a metallic wire that is disposed in one or both of the cavities containing the first and last dielectric filter. The metallic wire closely tracks the outer circumference of the dielectric resonator, preferably, without touching the surface of the resonator. In one aspect, for example, on the connector to the antenna, the metallic wire connects to the antenna connection and couples a metallic transmit filter to the first dielectric receive filter with appropriate phasing to produce the necessary two pass band responses. In another aspect, the metallic wire couples the last dielectric filter to a metallic filter of a downstream clean-up filter.

In yet another aspect of the invention, the LNA is formed on a low loss dielectric printed circuit board (PCB). The use of the low loss PCB is particularly important to produce low noise figure and when using a bypass option as part of the LNA circuit.

In one aspect of the invention, a radiofrequency device adapted for coupling to an antenna includes a housing having a plurality of cavities and an input and output, with the input being operatively coupled to the antenna and the output being operatively coupled to a base station. The RF device further includes a transmission path disposed within the housing and including a plurality of transmit resonators. The RF device also includes a receive path disposed within the housing that includes a plurality of filter sections, with each filter section having a plurality of receive resonators. A low noise amplifier is operatively coupled via an input to a last resonator in one of the plurality of filter sections and also operatively coupled via an output to the input of another of the plurality of filter sections. The RF device has a noise figure of less than 1.2 dB at the center band.

In another aspect of the invention, a radiofrequency device adapted for coupling to an antenna includes a housing having a plurality of cavities and an input and output, the input being operatively coupled to the antenna, the output being operatively coupled to a base station. The RF device further includes a transmission path disposed within the housing and including a plurality of transmit resonators. A pre-LNA filter section is disposed within the housing, the pre-LNA filter section including a receive filter having a plurality of cavities, each cavity holding a dielectric resonator. The RF device further includes a clean-up filter disposed in the pre-LNA filter section, the clean-up filter including at least one cavity disposed within the housing, the at least one cavity containing one or more coaxial resonators. A low noise amplifier is operatively coupled to a last coaxial resonator in the clean-up filter. The low noise amplifier is also operatively coupled to the input of a post-LNA receive filter. The RF device has a noise figure of less than 1.2 dB at the center band.

In still another embodiment, a radiofrequency device adapted for coupling to an antenna includes a housing having an input and output, the input being operatively coupled to the antenna, the output being operatively coupled to a base station. The RF device includes a transmission path within the housing that has a plurality of transmit resonators. The RF device further includes a first receive filter disposed within the housing and including a plurality of cavities, each cavity holding a dielectric resonator, wherein a transmit resonator located closest to the input is coupled to a first dielectric resonator using a conductor connected to the transmit resonator and terminating adjacent to the first dielectric resonator. A second receive filter is disposed in the housing, wherein a last dielectric resonator in the first receive filter is coupled to a first receive resonator in the second receive filter via a conductor connected to the first receive resonator of the second receive filter and terminating adjacent to the last dielectric resonator. The RF device also includes a low noise amplifier operatively coupled to a last resonator in the second receive filter, the low noise amplifier being operatively coupled to the input of a third receive filter.

It is one object of the invention to provide a high performance (low noise figure with rejection to potential interfering signals) yet small-sized TMA/MHA/TMB. The TMA/MHA/TMB is typically mounted close to the antenna to reduce insertion loss of the interconnecting cables and hence minimize deterioration of the noise figure of the system. The incorporation of dielectric resonators into the RF device provides high performance (e.g., low loss and excellent, high selectivity, filtering capabilities) in a small size that is readily amenable for mounting close to the antenna—a location where size and weight is at a premium and installation is facilitated by such features. Further features and advantages will become apparent upon review of the following drawings and description of the preferred embodiments.

DETAILED DESCRIPTION OF THE PREFERRED EMBODIMENTS

Figure 1:
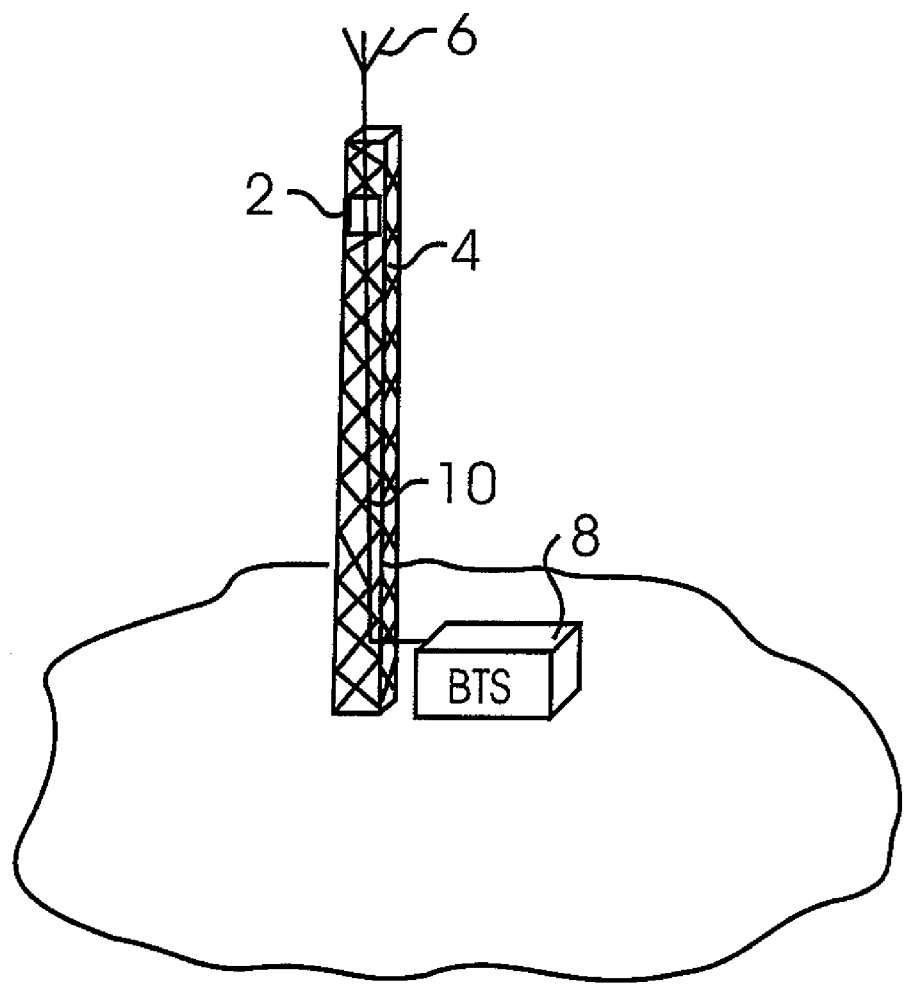
FIG. 1 illustrates a RF device such as a TMA mounted atop an elevated structure such as a tower, close to the antenna.

FIG. 1 illustrates a typical layout for an RF device 2 (e.g., TMA, MHA, and TMB). The RF device 2 may include filter and/or amplification functionality. The RF device 2 is disposed on a tower 4 or other elevated structure adjacent to an antenna 6. The RF device 2 is coupled to the antenna 6 and a base station (BTS) 8 via coaxial cable 10. The RF device 2 may be powered by a separate power line (not shown) or, alternatively, the low noise amplifier (LNA) and any other electronics may be powered through current provided in the coaxial cable 10. In one aspect, the RF device 2 is located on the tower 4 within ten feet of the antenna 6. In still other embodiments, the RF device 2 is located within six or even less than three feet of the antenna 6. The closer the RF device 2 is positioned adjacent to the antenna 6, the smaller the insertion loss created by the cabling connecting the RF device 2 to the antenna 6. In another alternative aspect of the invention, the RF device 2 is integrally formed with the antenna 6. For example, the RF device 2 and antenna 6 may be included in a single housing or unit.

Figure 2:
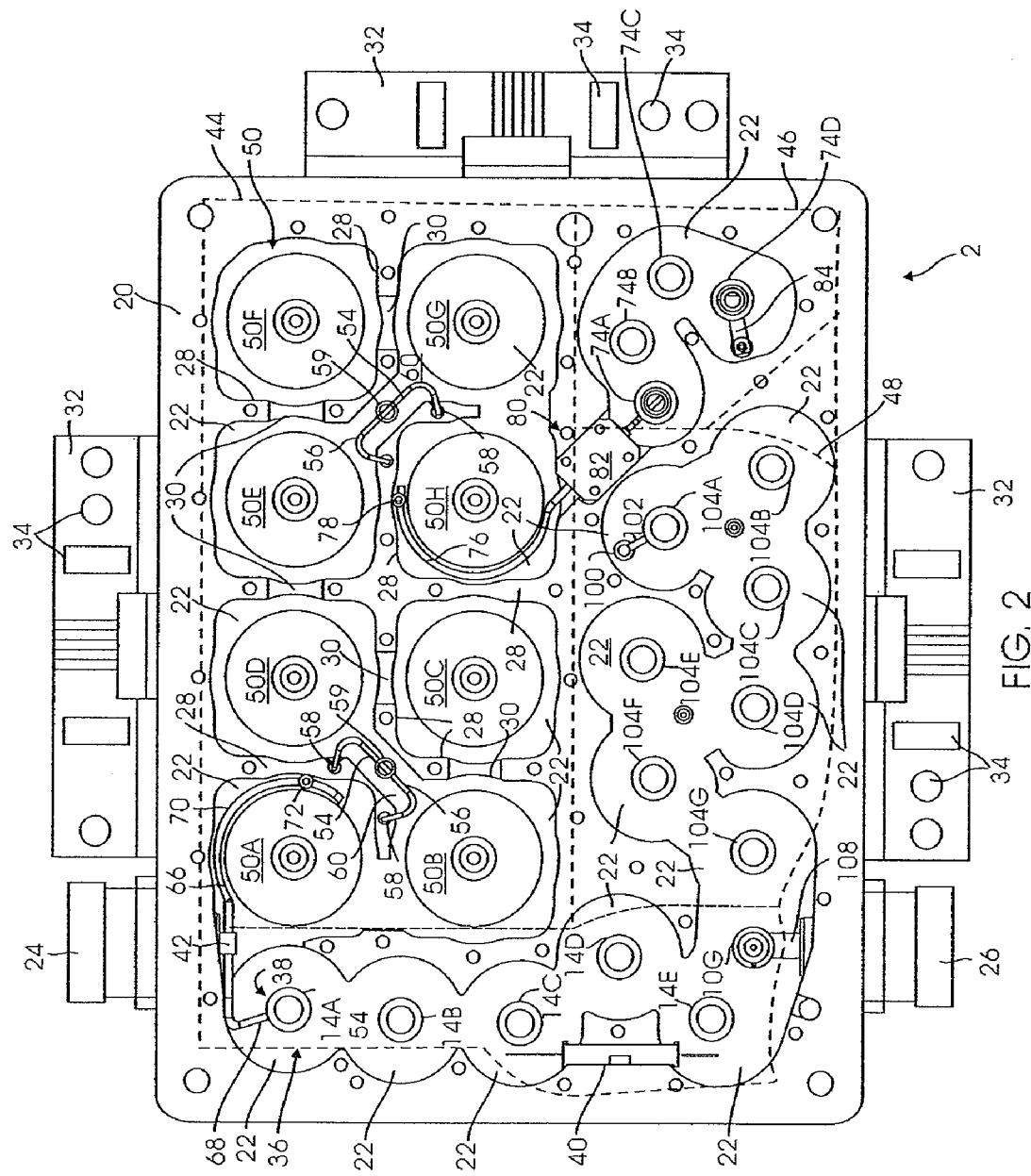
FIG. 2 illustrates a plan view (with seal, tuning cover, and outer case removed) having a RF device having a transmit filter section and three receive filters sections.

FIG. 2 illustrates a RF device 2 according to one embodiment. The RF device 2 includes a housing 20 having a plurality of cavities 22 formed therein. The various cavities 22 are used to house the subcomponents (e.g., resonators) of the RF device 2. The housing 20 may be made out of aluminum or silver plated aluminum with the cavities 22 being milled from a solid work piece, cast, extruded, or suitably molded. The housing 20 includes a single input 24 that connects to the ends of coaxial cable 10 (not shown in FIG. 2). Similarly, the housing 20 includes a single output 26 that connects to ends of coaxial cable 10 connecting to the BTS 8 (not shown in FIG. 2). The input 24 and output 26 may include, for instance, female 7/16 DIN connectors.

Certain cavities 22, such as those that contain the dielectric resonators 50 (described in detail below), are open or free space regions formed by a series of walls 28 or partitions that generally separate the cavities 22 from one another. Still other cavities 22, such as those that contain the coaxial or metallic resonators 74, 104 may be contiguous with one another. As seen in FIG. 2, certain portions of the walls 28 have open regions or irises 30 (described in more detail below) to permit coupling between adjacent resonators 50.

As seen in FIG. 2, the housing 20 includes one or more mounting plates or brackets 32 that are used to mount the RF device 2 to the tower 4 or other desired location. The mounting bracket 32 may include a number of holes or slots 34 through which mounting bolts, hose clamps, or the like (not shown) may be passed.

Still referring to FIG. 2, The RF device 2 has a transmission path that includes a transmit filter 36. The transmission path generally allows a transmit path permitting signals to be sent from the BTS 8 to a user (via the antenna 6) at the appropriate frequency. As seen in FIG. 2, the transmit path 36 includes multiple transmit resonators 14 that are disposed in respective cavities 22 formed within the housing 20. In the illustrated embodiment, the multiple resonators 14 (e.g., five poles are illustrated) include metallic rod (e.g., aluminum or a silver plated material, including stainless steel) resonators 14. FIG. 2 illustrates five such resonators 14A, 14B, 14C, 14D, 14E. Optionally, the RF device 2 may include a coupling 40 between non-adjacent resonators that may be used to enhance the performance of the device 2. In FIG. 2 the coupling 40 is shown between resonators 14C and 14E and this coupling 40 produces a transmission zero in the insertion loss versus frequency response of the filter 36. The coupling 40 is of an appropriate phase such that a transmission zero is produced on the low frequency side of the pass band of the transmit filter 36.

Still referring to FIG. 2, the input 24 is coupled to a rod-like member or conductor 42, which is the center conductor of the coaxial connection through housing 20, that connects the input 24 to a coupling and phasing wire (described in more detail below) that connects the conductor 42 to the transmit resonator 14A, and to the first dielectric receiving resonator 50A. Generally, the RF device 2 includes at least one receive filter section. In the RF device 2 of FIG. 2, there is a first receive filter section 44 that includes a plurality of dielectric-based resonators 50. A second receive filter section 46 is used as a clean-up filter to filter out either high or low frequency spurious frequency responses downstream of the first receive filter section 44. A third receive filter section 48 is used to filter the output from a low noise amplifier 90 (not shown in FIG. 2 but described in more detail below) and also is used to diplex the output of the transmit filter 36 and to reject transmit signals from connection 26 from entering the low noise amplifier 90.

Figure 3:
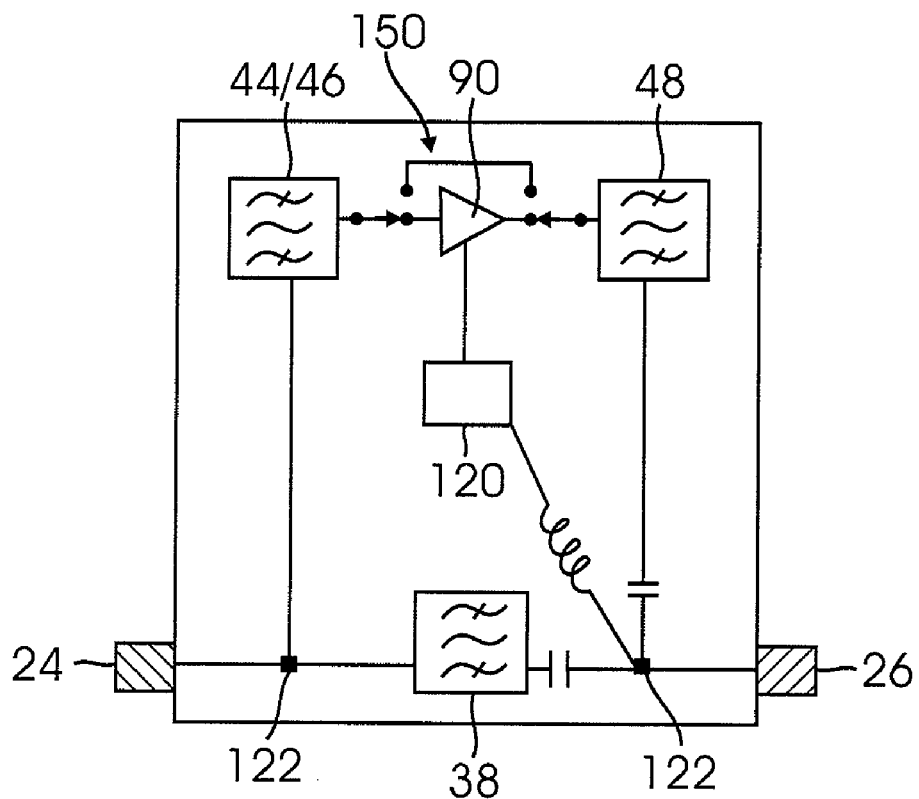
FIG. 3 illustrates a schematic representation of the RF device according to one embodiment.

FIG. 3 illustrates a schematic representation of the RF device 2 according to one embodiment. FIG. 3 illustrates the transmit filter 36 in addition to the pre-LNA receive filter sections 44, 46 and the post-LNA receive filter section 48. FIG. 3 also illustrates control circuitry 120 that is used to monitor the operation of the LNA 90. For example, the control circuitry 120 may initiate an alarm and/or switch into bypass mode to bypass the LNA 90 through a bypass transmission line 150. The control circuitry 120 may also include communications features that enable remote monitoring and diagnostics. FIG. 3 also illustrates transient current and voltage (which is usually residual energy as a result of a proximal lightning strike) protectors 122 that are integrated into the RF device 2. Additionally, the control circuitry 120 contains further over voltage and surge current protection.

Figure 4:
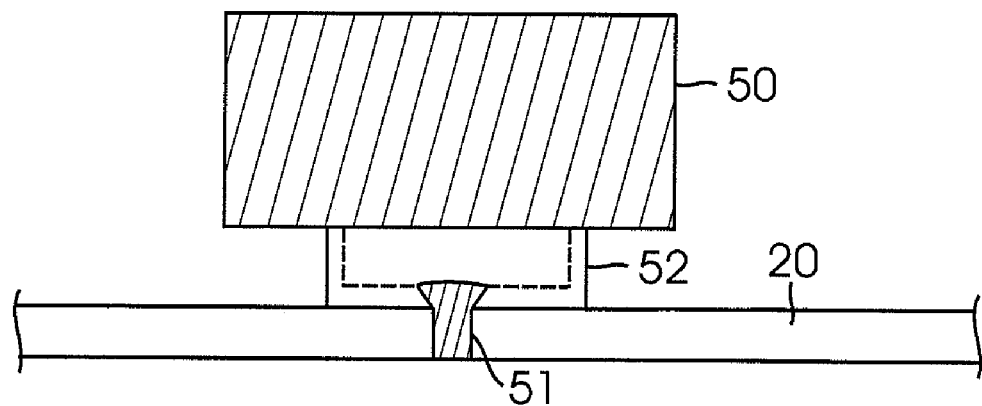
FIG. 4 illustrates a side view of a single dielectric resonator (e.g., puck) which can be used in a first receive filter section.

Referring back to FIG. 2, the first receive filter section 44 includes a plurality of cavities 22 formed within the housing 20. Eight such cavities 22 are illustrated although more are less may be employed. Each cavity 22 of the first receive filter section 44 contains a dielectric-based resonator 50. The dielectric-based resonators 50 may be round or cylindrical in shape and mounted to the housing 20 via a low loss and low dielectric constant electrical insulator 52 such as alumina as illustrated in FIG. 4. Securing the resonators 50 to the housing 20 may be accomplished by screws 51 or the like that fix the resonator 50 relative to the housing 20.

FIG. 4 illustrates a side view of one resonator 50 coupled to the electrical insulator 52. While the resonator 50 illustrated in FIG. 4 is circular in shape, it should be understood that other geometries are contemplated. The resonators 50 and cavities 22 holding the same are preferably dimensioned to have a relatively small gap between the exterior surface of the resonators 50 and the walls 28 of the cavity 22. For example, in one preferred aspect, the ratio of the diameter of the cavity 22 to the diameter of the dielectric resonator 50 is less than 1.5:1. In cases wherein the cavity 22 is non-circular, the "diameter" dimension refers to the distance between the center of the cavity 22 and the closest wall 28. As seen in FIG. 2, the cavity 22 includes a circular cutout arranged in a square-like cavity 22. By having the metal walls 28 close to the dielectric resonator 50, this provides a compact structure and also provides more coupling and tuning capability for the coupling between resonators 50 through the irises 30.

In one aspect, the dielectric-based resonators 50 are formed from a dielectric material having a dielectric constant of at least twenty. The material used may include titanate-based, niobate-based, or tantalate (BZT)-based dielectric materials. Examples of materials usable in the dielectric-based resonators 50 include Series Nos. 8300, 4300 and 4500 dielectrics available from Trans-Tech, Inc., 5520 Adamstown Road, Adamstown, Md. 21710. There are several choices for dielectric materials with the trade-offs being size (dielectric constant), rejection (Q), and cost.

The first receive filter section illustrated in FIG. 2 is an eight-pole receive filter having eight resonators 50 in which coupling between adjacent resonators 50 is accomplished via irises 30 in the walls 28 of the housing 20. Non-adjacent coupling between resonators 50B/50D and 50E/50G is accomplished by use of resonant coupling elements 54. This non-adjacent coupling is commonly referred to as cross coupling in a "triplet", as know by those skilled in the art. Cross coupling in a triplet can result in a single transmission zero on either the high or low side of the pass band, depending on the phase of the coupling between the non-adjacent resonators. When four resonators are used, the group is commonly called a "quadruplet" and coupling between the end resonators can produce a pair of transmission zeros or complex frequency zeros, depending on the phase of this coupling.

Figure 6:
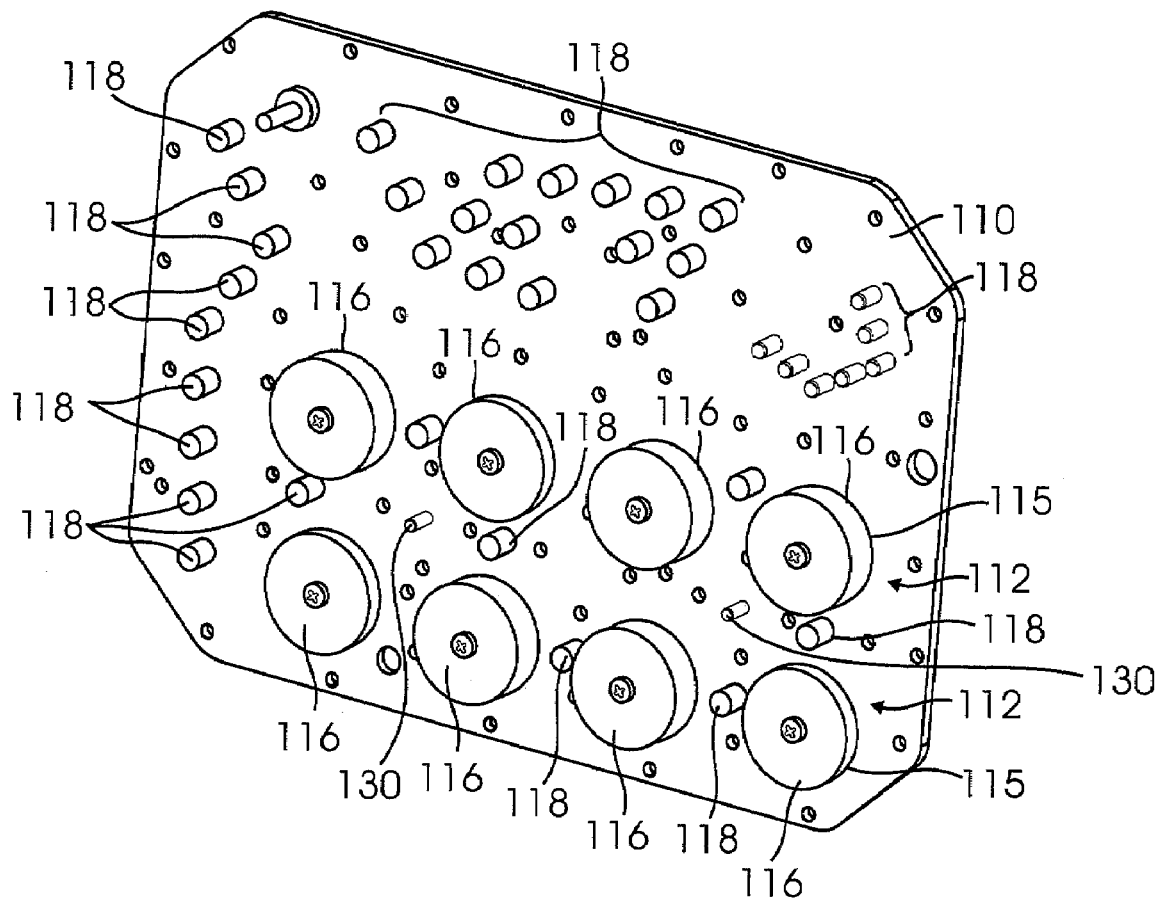
FIG. 6 illustrates a top perspective view of the underside of a tuning cover according to one aspect of the invention.

In one aspect, the resonant coupling elements 54 are formed from a segment of metallic wire 56 (e.g., copper wire) having both ends 58 secured and electrically grounded to the housing 20 (e.g., using pre-drilled holes or the like). The wire 56 is secured to a cylinder 59 made of brass or other conductive material that is situated between the coupled resonators 50B/50D and 50E/50G. As seen in FIG. 2, there is a groove or slot 60 that is formed between the cavities 22 containing the non-adjacent resonators 50B/50D and 50E/50G. Of course, instead of a slot 60 the cylinder 59 may be situated within an iris 30 connecting the cavities 22. Together, with the cylinder 59 and tuning screws 130 (as seen in FIG. 6), the wire 56 acts, as part of a coaxial resonator, grounded at each end 58 which predominantly magnetically couples to the magnetic fields of the dielectric resonators (e.g., pucks) 50B/50D and 50E/50G. The cylinder 59 attached to the center of the wire 56 allows the wire 56 to be formed so as to strongly couple to the magnetic fields located within the cavities that the wire is grounded. The tuning effect is generated by moving the tuning screws 130 deeper into, or retracting out of, cylinders 59 to change the resonant frequencies of coupling elements 54 lower, or higher, respectively.

The resonance can be tuned by moving a screw 130 attached to the tuner cover plate 110 (shown in FIG. 6) into (or out of) the center of the cylinder 59. Rotation of the screw 130 changes the frequency of the resonance and hence moves the position of the required transmission zero (in frequency). When the tuning screw 130 creates a resonance below the pass band of the filter 44, the resulting transmission zero is on the low side of the pass band, and when it is tuned such that the resonance is on the high side of the pass band, the resulting transmission zero is on the high side of the pass band. Thus, the placement in frequency of the transmission zero is set by the magnitude and phase of the coupling generated by this resonant structure.

Referring back to FIG. 2, the conductor 42 made from a low loss metal such as brass and coupled to the input 24 is secured to the wire 66 that is used as the phasing element necessary to create a transmit/receive diplexer. The wire 66 may be a copper wire that is soldered to the conductor 42 to form a metal-metal bond (e.g., SN62 solder). One end 68 of the wire 66 is bonded to the transmit resonator 14A using, for example, solder. The remaining end 70 of the wire 66 then curves about the periphery of the first resonator 50A and is held in place via a support post 72. The support post 72 may include a polymer rod having a hole therein through which the wire 66 passes. The rod or tube 72 may have a hole for receiving a locking screw (not shown) that can be used to adjust and secure the wire 66 relative to the exterior of the resonator 50. While the wire 66 is in close proximity to the exterior of the resonator 50A, it may also have a dielectric sheath (e.g., PTFE or other non-conductive polymer) in order to prevent the metal wire from actually touching the resonator 50A. The wire 66 acts to couple the metallic resonator 14 to the dielectric-based resonator 50A and also acts, itself, as a resonator.

Still referring to FIG. 2, the last dielectric resonator 50H is coupled to the first resonator 74A in the second receive filter section 46 using a wire 76 similar to wire 66. In particular, a metallic wire 76 (e.g., copper) bends around the outside periphery of the last resonator 50H and is held in place via a support post 78 like support post 72. The wire 76 also may have a dielectric sheath (e.g., PTFE) and bends around the exterior surface of the dielectric resonator 50H and is fixedly secured to the housing 20 via a mount 80. The mount 80 may include a PTFE block of material having a hole through it (not shown) that holds the wire 76. The PTFE block may be covered with a metal cover plate 82. The wire 76 is bonded to the first resonator 74A that forms the clean-up filter using, for example, solder.

The clean-up filter section 46 may include cylindrical or rod-shaped metallic resonators 74A, 74B, 74C, 74D. The Rx clean-up filter 46 is provided to clean-up spurious frequency responses prior to transmission to the BTS 8 or the LNA 90. As seen in FIG. 2, a brass rod 84 is bonded to the last resonator 74D and couples to the input of LNA 90 illustrated in FIG. 5) through an orthogonal extension of rod 84.

Figure 5:
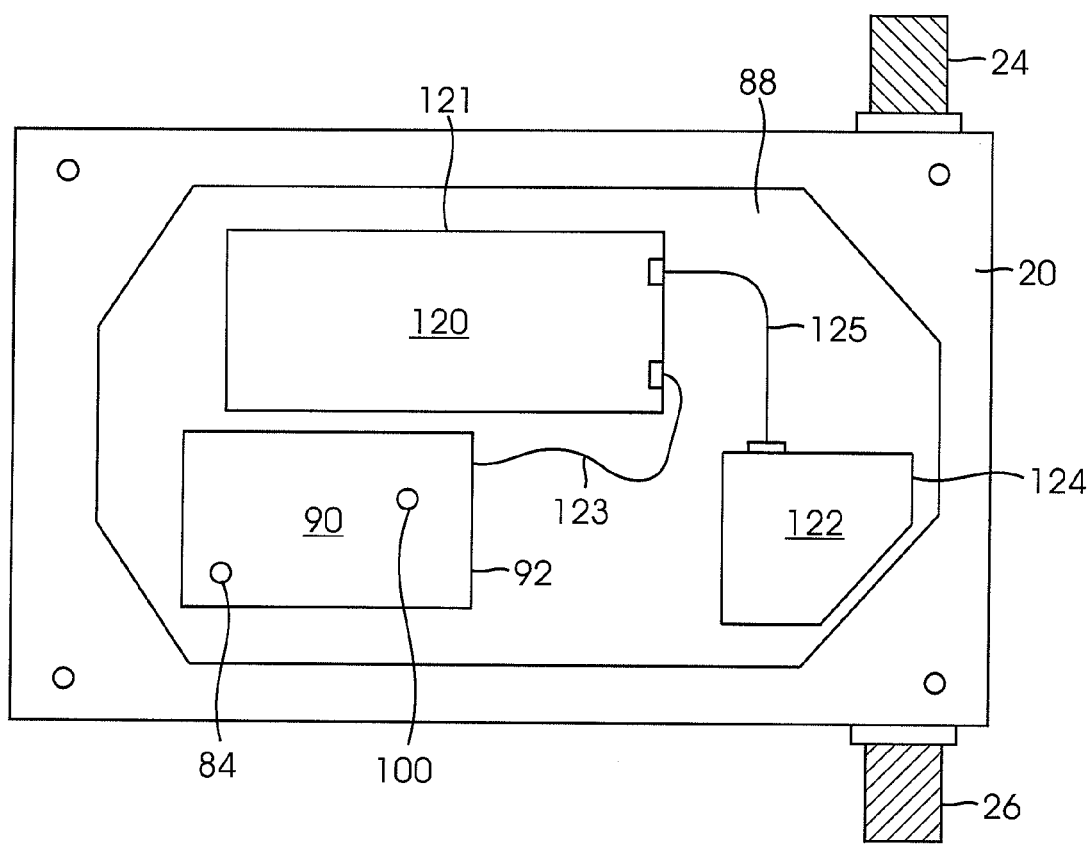
FIG. 5 illustrates the LNA according to one aspect of the invention.

The LNA 90 illustrated in FIG. 5 is formed on a printed circuit board 92 that is mounted to the backside of the housing 20. For example, the LNA 90 may be disposed on an intermediate layer or cover 88. In this regard, the LNA 90 is isolated away from the cavities 22 contained in the housing 20. The printed circuit board 92 used for the LNA 90 is preferably a low-loss dielectric-based laminate or flex circuit. For example, the LNA 90 may be mounted on RO4003 woven glass/ceramic loaded thermoset plastic resin circuit board available from Rogers Corporation, Rogers, Conn. Other circuit board material, such as RT/Duroid, RO3000 series, RO4000 series or RO5000 series materials also available from Rogers Corporation, may be used provided the Df (also known as the dissipation factor or dielectric loss tangent, tan δ) is low (e.g. less than 0.004 at 2 GHz). The low loss PCB 92 used for the LNA 90 contributes to the overall low noise figure of the RF device 2 and is critical in minimizing the overall noise figure as well as the loss when in bypass.

The LNA 90 amplifies signals down to the BTS 8. The LNA 90 includes dual amplifiers, operated in a balanced (e.g. parallel) configuration, with an overall gain of 13 dB. The LNA 90 further includes a bypass feature 150 having, for instance, single-pole-double-throw mechanical relays (or other such bypass switching device, e.g. semiconductor based or MEMS based switches). In the event of failure, the LNA 90 may be bypassed entirely so that the transmission tower 4 can still function (albeit at a lower performance level).

FIG. 5 also illustrates control electronics 120 that are situated on a separate PCB 121. The control electronics 120 interface with the LNA 90 via wire harness 123. FIG. 5 also shows the residual transient voltage and surge current protector 122 (commonly referred to as a lightning protector) mounted on its own separate PCB 124. The printed circuit boards 121, 124 may be formed on a standard, FR4 printed circuit board laminate material (e.g., IS402 from Isola Group, Chandler, Ariz.). A wire harness 125 connects the lightning protector 22 to the control electronics 120. The lightning protector 122 is used to protect sensitive electronic components in the event of a proximal lightning strike that results in transient voltage spikes or surge currents incident on the unit.

Referring back to FIG. 2, the output of the LNA 90 connects to a brass connector 100 that projects through the housing 20 and connects to a wire 102 (e.g., copper wire) that is coupled to the first resonator 104A of the third receiver filter section 48. The third receiver filter section 48 is a post-LNA filter section and forms a multi-pole filter (e.g. seven poles) from a plurality of metallic rod resonators 104A, 104B, 104C, 104D, 104E, 104F, 104G. The resonators 104A-104G may be made from, for example, silver plated stainless steel. This filter may have coupling between non-adjacent resonators to produce transmission zeros (real or complex frequency) as known by those skilled in the art. Two transmission zeros are formed by the two triplet combinations of resonators 104A, 104B, 104C and 104D, 104E, 104F. As known by those skilled in the art, the predominantly magnetic, non-adjacent resonator coupling in these triplets generates two transmission zeros above the passband.

Still referring to FIG. 2, the last of the metallic rod resonators 104G is coupled to a coupling post 106 that is formed from, for example, aluminum. The coupling post 106 acts as the transmit/receive diplexer at the junction of the capacitors and inductor at junction 122 as illustrated in FIG. 3. A brass rod 108 forms the inner conductor of a coaxial transmission line that connects the coupling post 106 to the output 26 of the RF device 2.

FIG. 6 illustrates a perspective view of the underside of the tuner cover plate 110 that is mounted on the housing 20 to enclose the cavities 22. The tuner cover plate 110 is preferably made of the same material as the housing 20, e.g., aluminum. The tuner cover plate 110 includes a plurality of rotatable tuning members 112. In one aspect, the tuning members 112 include a rotatable shaft 114 (seen in FIG. 7) projecting through the surface of the tuner cover plate 110 at one end and affixed to a dielectric tuning body 116 at the other. The rotatable shaft 114 is electrically non-conductive and may be made of a machinable polymer such as, for instance, ULTEM 1000, but may be made from a threaded metal if the impact on center frequency and loss is acceptable. The rotatable shaft 144 may be secured to the tuning body 116 via a screw 115. As the shaft 114 is rotated, the dielectric tuning body 116 is either advanced toward or away from the adjacent resonator 50A-50H. The tuning body 116 may be formed from a disk of dielectric material that is the same material that is used to form the resonators 50. Alternatively, the dielectric material used for the tuning body 116 may be different from the material used for the resonators 50. As one example, the dielectric material for the tuning body 116 may include D8300 material from Trans-Tech, Inc Adamstown, Md.

Still referring to FIG. 6, tuning screws 118 may be provided within the tuner cover plate 110 to tune the resonant frequency of the resonators 14, 74, 104 in the housing 20. Two separate tuning screws 130 may be provided to tune the resonant coupling elements 54. In one aspect of the invention, the tuning screws 118 are formed from a low loss metallic material such as brass or silver plated metal. The ends of the tuning screws 118 that project into the housing 20 are preferably blunted or rounded to improve performance (e.g., the unload resonator quality factor and the voltage breakdown characteristics). Tuning screws 118 may be provided directly above each resonator 14, 74, 104 in addition to being located between adjacent and non-adjacent resonators 14A-14E, 74A-74D, and 104A-104G and adjacent dielectric resonators 50A-50G. In this regard, the RF device 2 may be tuned after manufacture to the correct specifications.

Figure 7:
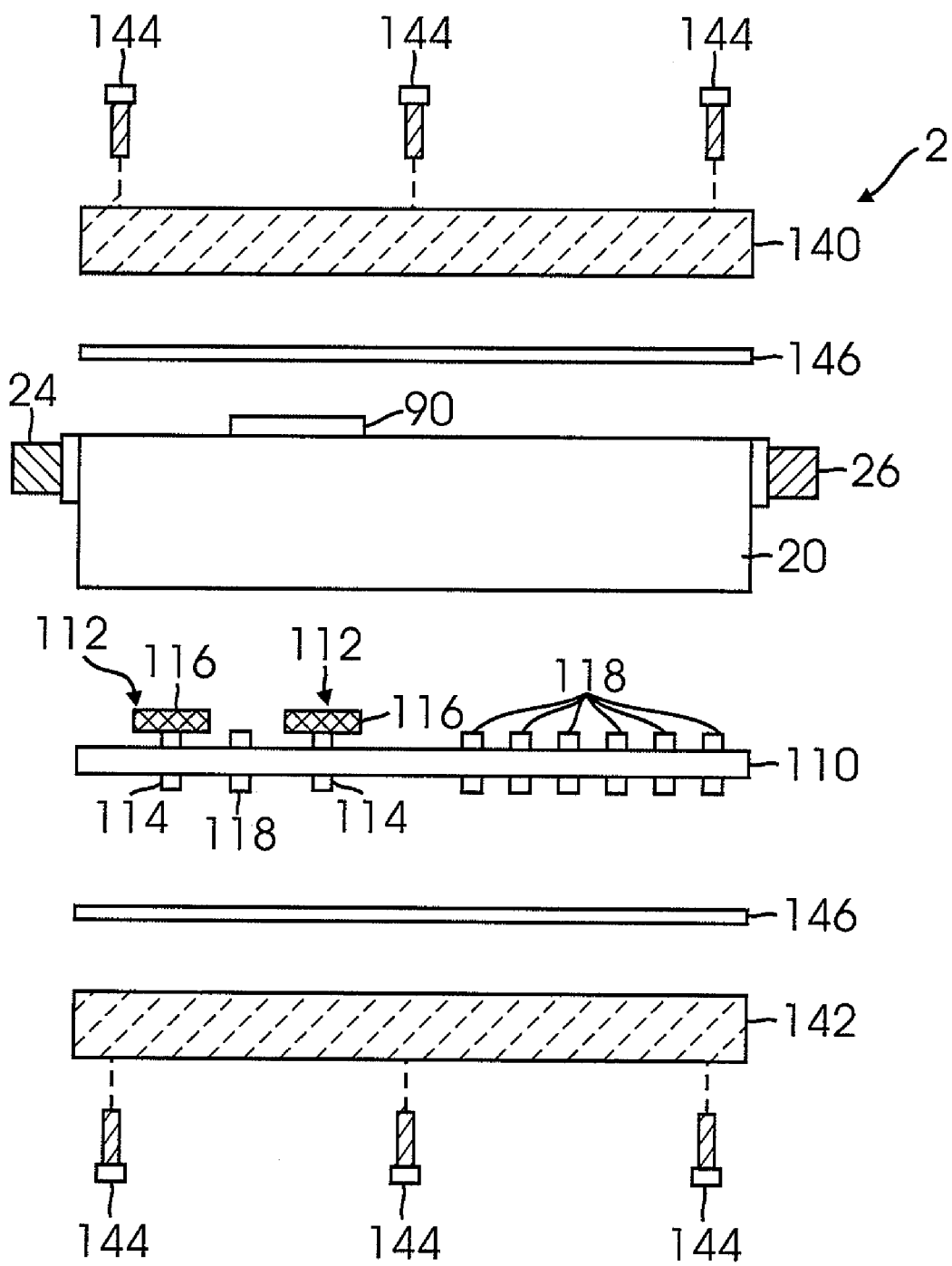
FIG. 7 illustrates an exploded side view of an RF device according to one embodiment. The housing is illustrated along with the tuning cover in addition to the outer case and seals.

FIG. 7 illustrates an exploded side view of the RF device 2 according to one aspect of the invention. The housing 20 is illustrated along with the LNA 90 located on the backside of the cavities 22. The tuner cover plate 110 is illustrated along with the dielectric-based tuning members 112 and tuning screws 118. The tuner cover plate 110 is directly mounted onto the housing 20 to form metal-to-metal contact to complete the cavities containing the resonator elements. The tuner cover plate 110 may be screwed to the housing screws or bolts (not shown). After the tuner cover plate 110 is fixed to the housing 20, outer casing members 140, 142 are secured to the RF device 2 using a plurality of screws or bolts 144. The outer casing members 140, 142 protect the RF device 2 and provide for additional protection from weather, sunlight, and the like. The outer casing member 140 may be made of a rugged polymer material such as metal (aluminum, machined or cast)

or polymer. The casing should also be coated with a weatherizing paint or finish. As seen in FIG. 7, o-ring seals 146 are used to form a tight seal between the outer casing members 140, 142 and the housing 20.

In one aspect, the overall volume of the RF device 2 when assembled (excluding mounting gear) is less than about 220 in$^3$ in size while at the same time the RF device 2 has performance characteristics not achievable with conventional metal resonator/cavity filters. The RF device 2 described herein has a small volume or footprint and high resonator Q values. The RF device 2 may be implemented in a wireless network implementing protocols such as TDMA, CDMA, OFDM, or TDD. Preferably, the RF device 2 can be used in networks operating a frequencies exceeding 1.5 GHz, or even 2 GHz.

Figure 8:
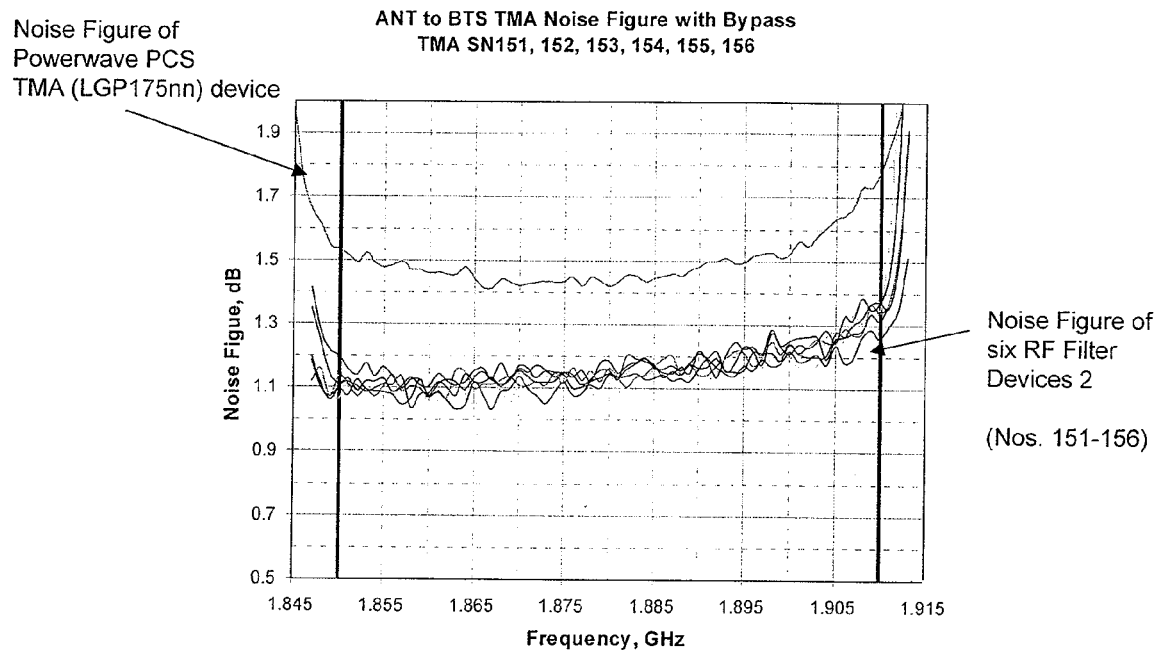
FIG. 8 illustrates the measured noise figure response of six RF devices over the PCS frequency range in addition to the measured noise figure of the Powerwave PCS TMA (LGP175nn) device.

FIG. 8 illustrates the measured noise figure of six different RF devices 2 as described herein. The noise figure represents the antenna 6 to BTS 8 noise figure with the RF device 2 having bypass capabilities (and hence includes the noise figure impact of the bypass circuitry). The noise figure is shown from 1.85 to 1.91 GHz—the current band of frequencies used for PCS applications in the United States. In one aspect of the invention, the noise of the receive path is less than 1.2 dB over a substantial part of the band of interest. Substantial is meant to indicate that greater than 50% of the band of interest (e.g., in FIG. 8 the PCS band) has a noise figure less than 1.2 dB. As compared to noise figure from the Powerwave PCS TMA device (LGP175nn) illustrated in FIG. 8, which is believed to be the best TMA currently available, the current RF device offers a significantly lower noise profile (less than 1.2 dB as compared to the specified 1.6 dB of Powerwave PCS TMA—a 25% decrease (in units of dB's)).

For example, at 1.852 MHz, the noise in the RF device 2 is around 1.08-1.17 dB. At 1.880 MHz, the noise in the RF device 2 is around 1.09-1.18 dB. Finally, at around 1.908 MHz, the noise in the RF device 2 is around 1.28-1.39 dB. At the higher frequencies, the improvement in the performance of the RF device 2 as compared to the Powerwave device is even more apparent. The RF device 2 also provides Tx rejection of greater than 80 dB. It should be noted that an improvement (i.e., reduction) of about 0.2 dB can be reached if the RF device 2 does not utilize a bypass and the components used to create such a bypass feature.

As explained above, one benefit of a reduced noise figure is that a mobile or PCS carrier is able to increase the coverage area of a cellular base station 8. By mounting the RF device 2 of the type disclosed herein close to or at the antenna 6, the area of uplink coverage may increase in excess of 20%. The greater coverage of a particular BTS 8 means that fewer BTS 8 have to be built and sited for a given coverage area. The RF devices 2 are thus able to decrease the total outlay of capital necessary to establish and implement wireless network capability across a given geographic area.

While the RF device 2 has generally been described in terms of operating in dual-duplex mode having a single coax output, the RF device 2 may also be configured in a single-duplex mode having two coax outputs. In addition, in still other alternative embodiments, the RF device 2 may operate without any transmission functionality. In this regard, the RF device 2 may operate in a simplex mode having just receive capabilities. Also, one or more the second and third receive filter sections 46, 48 may be omitted in certain embodiments. For example, the clean-up filter section 46 may be optional and omitted from certain embodiments. Also dual or multiple RF devices 2 may be constructed within a single housing or formed by appropriate connection(s) of multiple housings to form a single unit.

While embodiments of the present invention have been shown and described, various modifications may be made without departing from the scope of the present invention. The invention, therefore, should not be limited, except to the following claims, and their equivalents.

What is claimed is:

1. A radiofrequency device adapted for coupling to an antenna comprising:
    a housing having a plurality of cavities and an input and output, the input being operatively coupled to the antenna, the output being operatively coupled to a base station;
    a transmission path disposed within the housing and including a plurality of transmit resonators;
    a receive path disposed within the housing, the receive path including a plurality of filter sections, each filter section including a plurality of receive resonators;
    a low noise amplifier operatively coupled via an input to a last resonator in one of the plurality of filter sections, the low noise amplifier being operatively coupled via an output to the input of another of the plurality of filter sections; and
    wherein the radiofrequency device has a noise figure of less than 1.2 dB at the center band.

2. The radiofrequency device according to claim 1, wherein the receive path comprises a first receive filter section having a plurality of cavities, each cavity holding a dielectric resonator.

3. The radiofrequency device according to claim 2, wherein the receive path includes a clean-up filter section comprising at least one cavity disposed within the housing, the at least one cavity containing one or more coaxial resonators.

4. The radiofrequency device according to claim 3, wherein a conductor is secured to a first coaxial resonator in the clean-up filter section, the conductor also being operatively coupled to a last dielectric resonator in the receive path, the conductor at least partially surrounding the last dielectric resonator in a non-contact arrangement.

5. The radiofrequency device according to claim 2, wherein a conductor is secured to a first transmit resonator in the transmission path, the conductor also being operatively coupled to a first dielectric resonator in the receive path, the conductor at least partially surrounding the first dielectric resonator in a non-contact arrangement.

6. The radiofrequency device according to claim 2, further including a tunable resonant coupling element configured to generate a frequency variable transmission zero comprising a predominantly magnetic coupling between non-adjacent dielectric resonators in the receive path and the magnetic field of the resonant coupling element, the tuning effect being generated by changing the resonant frequency of the coupling element.

7. The radiofrequency device according to claim 6, wherein the transmission zero is disposed between a second and fourth dielectric resonator in an eight-pole dielectric resonator system.

8. The radiofrequency device according to claim 6, further including a second resonant coupling element configured to generate a frequency variable transmission zero comprising a predominantly magnetic coupling between non-adjacent dielectric resonators in the receive path and the magnetic field of the second resonant coupling element, the tuning effect being generated by changing the resonant frequency of the coupling element.

9. The radiofrequency device according to claim 8, wherein the second transmission zero is disposed between a fifth and seventh dielectric resonator in an eight-pole dielectric resonator system.

10. The radiofrequency device according to claim 2, wherein a ratio of the diameter of the cavity to a diameter of the dielectric resonator contained in the cavity is less than 1.5:1.

11. The radiofrequency device according to claim 1, wherein the radiofrequency device is located between the antenna and a base station.

12. The radiofrequency device according to claim 1, wherein the radiofrequency device has a noise figure of less than 1.2 dB over a substantial portion of a receive frequency band of interest.

13. The radiofrequency device according to claim 12, wherein the frequency band of interest comprises a sub-band within the range of 1.5 GHz to 2.5 GHz.

14. The radiofrequency filter device according to claim 1, wherein the low noise amplifier is disposed on a low loss dielectric printed circuit board having a dissipation factor (Df) of 0.004 or less.

15. A radiofrequency device adapted for coupling to an antenna comprising:
a housing having a plurality of cavities and an input and output, the input being operatively coupled to the antenna, the output being operatively coupled to a base station;
a transmission path disposed within the housing and including a plurality of transmit resonators;
a pre-LNA filter section disposed within the housing, the pre-LNA filter section including a receive filter having a plurality of cavities, each cavity holding a dielectric resonator, the pre-LNA filter section further comprising a clean-up filter, the clean-up filter including at least one cavity disposed within the housing, the at least one cavity containing one or more coaxial resonators;
a low noise amplifier operatively coupled to a last coaxial resonator in the clean-up filter, the low noise amplifier being operatively coupled to the input of a post-LNA receive filter; and
wherein the radiofrequency device has a noise figure of less than 1.2 dB at the center band.

16. The radiofrequency device according to claim 15, wherein the radiofrequency device is located between the antenna and a base station.

17. The radiofrequency device according to claim 15, wherein a conductor is secured to a first coaxial resonator in the clean-up filter, the conductor also being operatively coupled to a last dielectric resonator in the pre-LNA filter section, the conductor at least partially surrounding the last dielectric resonator.

18. The radiofrequency device according to claim 15, wherein the radiofrequency device has a noise figure of less than 1.2 dB over a substantial portion of a receive frequency band of interest.

19. The radiofrequency device according to claim 18, wherein the frequency band of interest comprises a sub-band within the range of 1.5 GHz to 2.5 GHz.

20. The radiofrequency device according to claim 15, wherein a conductor is secured to a first transmit resonator in the transmission path, the conductor also being operatively coupled to a first dielectric resonator in the pre-LNA filter section, the conductor at least partially surrounding the first dielectric resonator.

21. The radiofrequency device according to claim 15, further including a tunable resonant coupling element configured to generate a frequency variable transmission zero comprising a predominantly magnetic coupling between non-adjacent dielectric resonators in the pre-LNA filter section and the magnetic field of the resonant coupling element, the tuning effect being generated by changing the resonant frequency of the coupling element.

22. The radiofrequency device according to claim 21, wherein the transmission zero is disposed between a second and fourth dielectric resonator in an eight-pole dielectric resonator system.

23. The radiofrequency device according to claim 21, further including a second resonant coupling element configured to generate a frequency variable transmission zero comprising a predominantly magnetic coupling between non-adjacent dielectric resonators in the pre-LNA filter section and the magnetic field of the second resonant coupling element, the tuning effect being generated by changing the resonant frequency of the coupling element.

24. The radiofrequency device according to claim 23, wherein the second transmission zero is disposed between a fifth and seventh dielectric resonator in an eight-pole dielectric resonator system.

25. The radiofrequency device according to claim 15, wherein a ratio of the diameter of the cavity to a diameter of the dielectric resonator contained in the cavity is less than 1.5:1.

26. The radiofrequency filter device according to claim 15, wherein the low noise amplifier is disposed on a low loss dielectric printed circuit board having a dissipation factor (Df) of 0.004 or less.

27. A radiofrequency device adapted for coupling to an antenna comprising:
a housing having an input and output, the input being operatively coupled to the antenna, the output being operatively coupled to a base station;
a transmission path within the housing including a plurality of transmit resonators;
a first receive filter disposed within the housing and including a plurality of cavities, each cavity holding a dielectric resonator, wherein a transmit resonator located closest to the input is coupled to a first dielectric resonator using a conductor connected to the transmit resonator and terminating adjacent to the first dielectric resonator;
a second receive filter disposed in the housing, wherein a last dielectric resonator in the first receive filter is coupled to a first receive resonator in the second receive filter via a conductor connected to the first receive resonator of the second receive filter and terminating adjacent to the last dielectric resonator; and
a low noise amplifier operatively coupled to a last resonator in the second receive filter, the low noise amplifier being operatively coupled to the input of a third receive filter.

28. The radiofrequency device according to claim 27, wherein the radiofrequency device is located between the antenna and a base station.

29. The radiofrequency device according to claim 27, wherein the radiofrequency device has a noise figure of less than 1.2 dB over a substantial portion of a receive frequency band of interest.

30. The radiofrequency device according to claim 29, wherein the frequency band of interest comprises a sub-band within the range of 1.5 GHz to 2.5 GHz.

31. The radiofrequency device according to claim 27, further including a tunable resonant coupling element configured to generate a frequency variable transmission zero comprising a predominantly magnetic coupling between non-adjacent dielectric resonators in the first receive filter and the magnetic field of the resonant coupling element, the tuning effect being generated by changing the resonant frequency of the coupling element.

32. The radiofrequency device according to claim 31, wherein the transmission zero is disposed between a second and fourth dielectric resonator in an eight-pole dielectric resonator system.

33. The radiofrequency device according to claim 31, further including a second resonant coupling element configured to generate a frequency variable transmission zero comprising a predominantly magnetic coupling between non-adjacent dielectric resonators in the first receive filter and the magnetic field of the second resonant coupling element, the tuning effect being generated by changing the resonant frequency of the coupling element.

34. The radiofrequency device according to claim 33, wherein the second transmission zero is disposed between a fifth and seventh dielectric resonator in an eight-pole dielectric resonator system.

35. The radiofrequency device according to claim 27, wherein a ratio of the diameter of the cavity to a diameter of the dielectric resonator contained in the cavity is less than 1.5:1.

36. The radiofrequency filter device according to claim 27, wherein the low noise amplifier is disposed on a low loss dielectric printed circuit board having a dissipation factor (Df) of 0.004 or less.

37. The radiofrequency filter device according to claim 27, wherein the conductor coupling the transmit resonator closest to the input to the first dielectric resonator is resonant outside of the passband of the receive dielectric filter.

38. The radiofrequency filter device according to claim 27, wherein the conductor coupling the last dielectric resonator in the first receive filter to the first receive resonator in the second receive filter is resonant outside of the passband of the receive dielectric filter.

* * * * *